Sept. 3, 1929.  C. C. LEVY  1,726,908
AUTOMATIC STATION
Filed Dec. 9, 1927  2 Sheets-Sheet 1

INVENTOR
Cyril C. Levy.
BY
ATTORNEY

Sept. 3, 1929.　　　　C. C. LEVY　　　　1,726,908
AUTOMATIC STATION
Filed Dec. 9, 1927　　　2 Sheets-Sheet 2

INVENTOR
Cyril C. Levy.
BY
ATTORNEY

Patented Sept. 3, 1929.

1,726,908

UNITED STATES PATENT OFFICE.

CYRIL C. LEVY, OF PITTSBURGH, PENNSYLVANIA, ASSIGNOR TO WESTINGHOUSE ELECTRIC & MANUFACTURING COMPANY, A CORPORATION OF PENNSYLVANIA.

AUTOMATIC STATION.

Application filed December 9, 1927. Serial No. 238,804.

My invention relates to automatic stations and more particularly to automatic stations wherein alternating-current dynamo-electric machines are adapted to be started from rest, synchronized with an alternating-current circuit and connected to the alternating-current circuit automatically in response to predetermined conditions.

One object of my invention is to provide means for controlling the starting of an alternating-current dynamo-electric machine and the synchronizing thereof with an alternating-current circuit, whereby the rate of admission of energy to a prime mover for the dynamo-electric machine is controlled in accordance with the difference in frequencies of the electromotive forces of the dynamo-electric machine and the circuit to which it is to be connected.

Another object of my invention is to provide a system of the above indicated character wherein the speed of adjusting the energy-admitting means is substantially in direct proportion to the difference in frequencies of the electromotive forces of the dynamo-electric machine and the electric circuit.

A further object of my invention is to provide means whereby the means for controlling the rate of admission of energy to the prime mover are adapted to accomplish rapid and accurate synchronizing of the dynamo-electric machine with the electric circuit before the machine is connected to the circuit and also to accomplish adjustment of the load assumed by the dynamo-electric machine after it is connected to the electric circuit.

Another object of this invention is to improve upon the means for automatically controlling the speed of a turbine generator described and claimed in the copending application of Roy J. Wensley, Serial No. 614,-391, filed January 23, 1923, for "automatic hydro-electric generating stations", and assigned to the Westinghouse Electric & Manufacturing Company.

Figure 1:
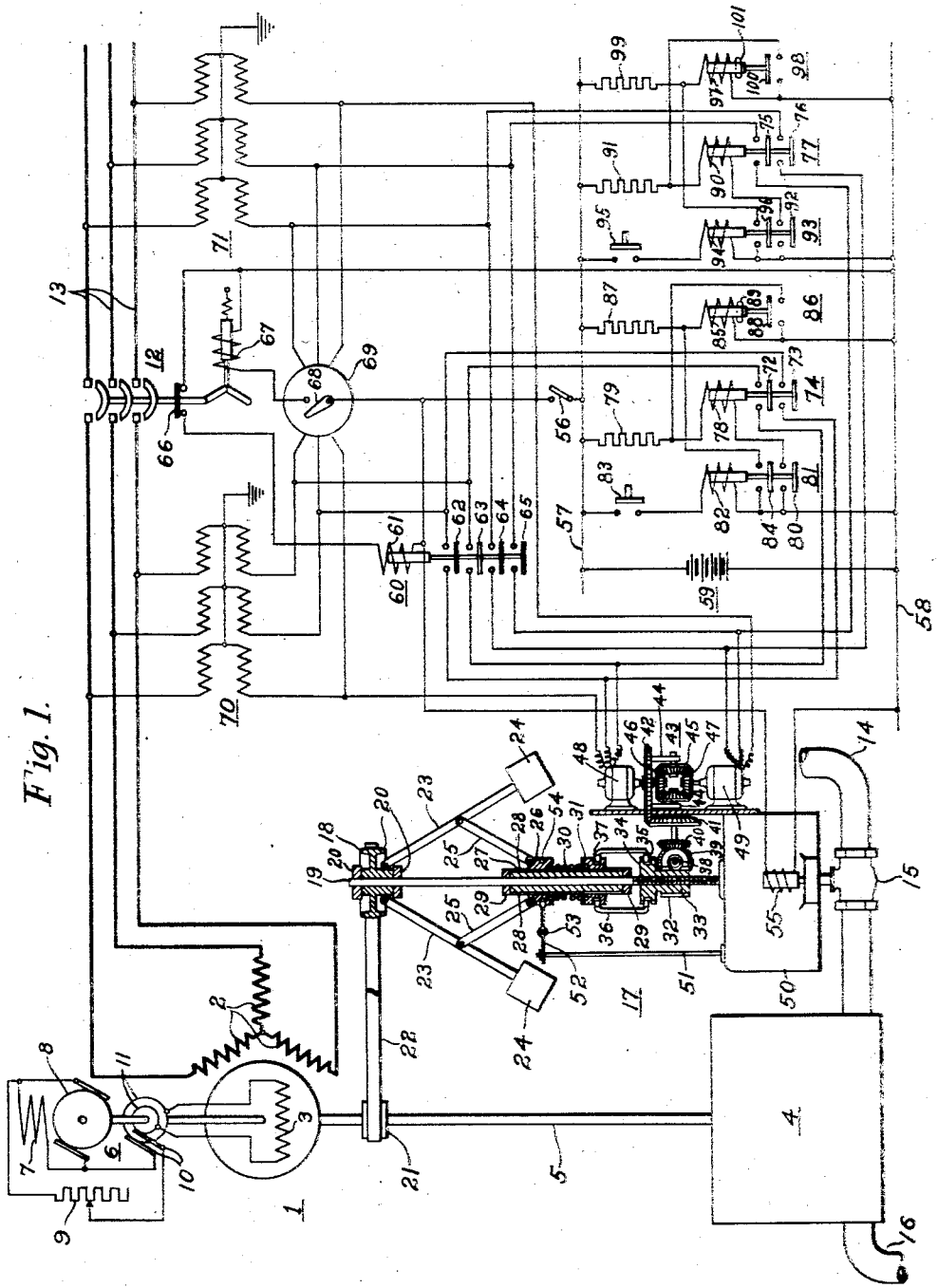

Further objects and advantages of my invention will appear in the following description, taken in connection with the accompanying drawings, in which Figure 1 is a diagrammatic representation of an automatic station embodying one embodiment of my invention.

Figure 2:
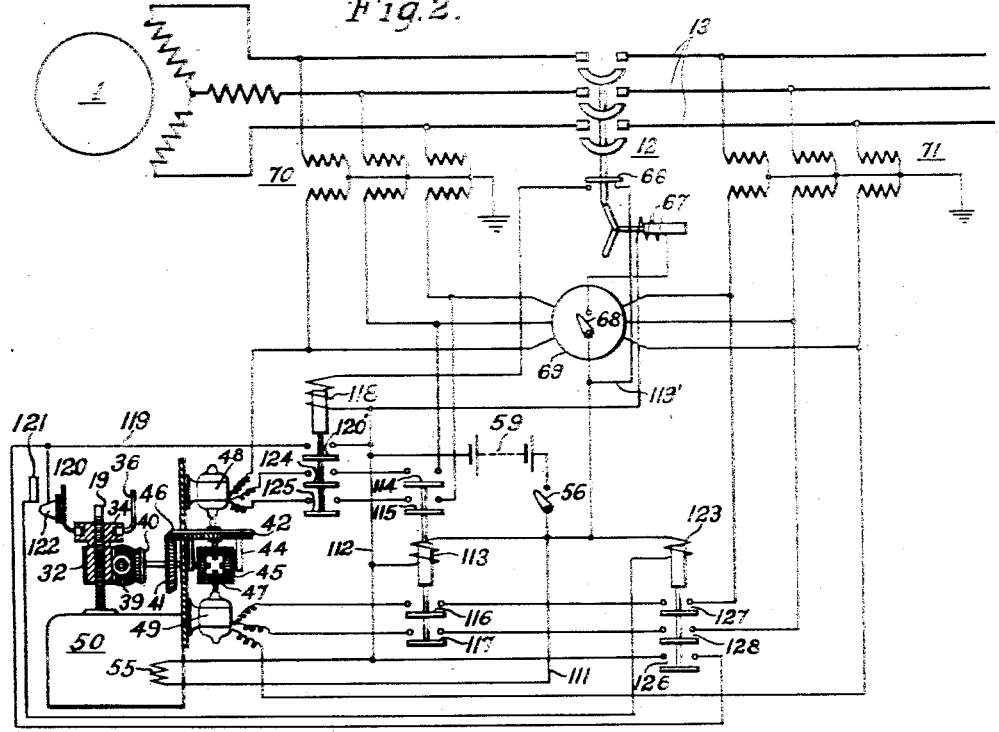
Figure 3:
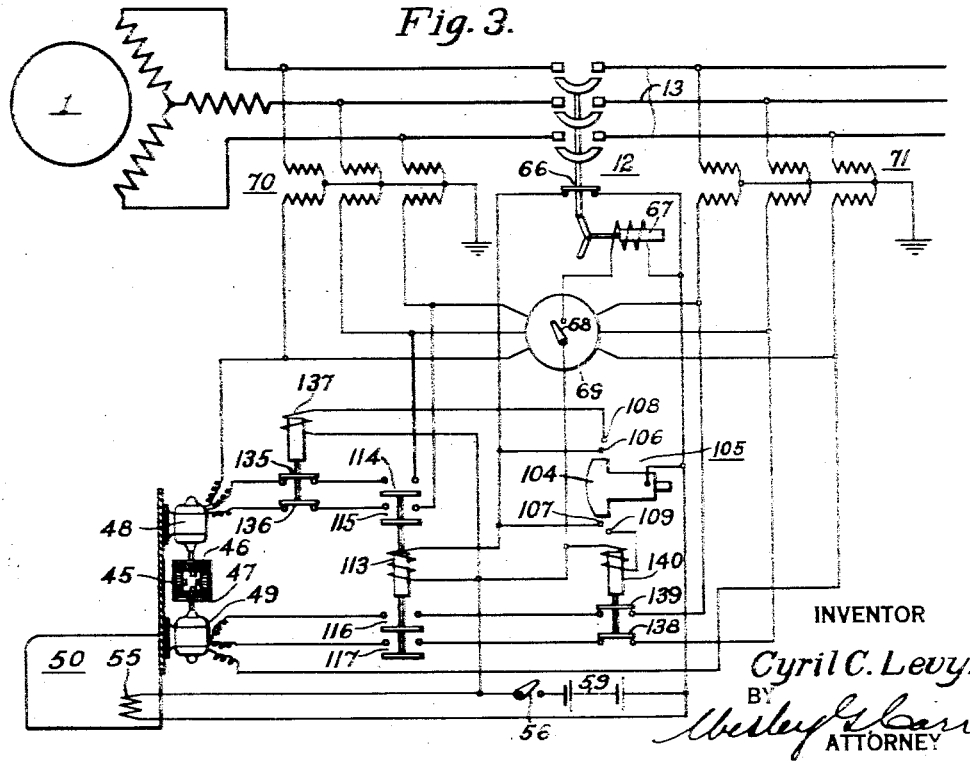

Figs. 2 and 3 diagrammatically illustrate modifications of my invention.

Referring to Fig. 1, an alternating-current dynamo-electric machine 1 comprises stationary armature windings 2 and a rotatable field-magnet winding 3 that is adapted to be driven by a prime mover 4 through a shaft 5. The field-magnet winding 3 is adapted to be energized from an exciter generator 6 comprising a stationary field-magnet winding 7 and a rotatable armature member 8 that is mounted on the shaft 5. The terminals of the exciter generator 6 are connected, through an adjustable resistor 9, brushes 10 and slip rings 11, to the terminals of the field-magnet winding 3. The armature windings 2 of the dynamo-electric machine 1 are adapted to be connected, through a circuit interrupter 12, to an alternating-current circuit 13.

The prime mover 4 receives fluid energy from a source (not shown) through a pipe or conduit 14 and a gate valve 15. A pipe or conduit 16 is provided for discharging the fluid from the prime mover 4. The degree of opening of the gate valve 15 is controlled by a fly-ball governor 17. The governor 17 comprises a driving pulley 18 that is rotatably mounted on a fixed vertical shaft 19 and vertically fixed thereon by two fixed collars 20. The governor 17 is driven at a speed proportional to the speed of the dynamo-electric machine 1 and the prime mover 4, by means of a pulley 21, that is mounted on the shaft 5, and a belt 22 that engages the pulleys 18 and 21.

Two lever arms 23 are pivotally secured to the hub of the pulley 18 and are provided with weights or fly balls 24 at the extremities thereof. Two lever arms 25 are pivotally secured, at their upper or outer ends, to corresponding intermediate points of the lever arms 23. The lower or inner ends of the arms 25 are secured to a rotatable collar 26. The collar 26 is slidably mounted on a rotatable sleeve 27 by means of keys or splines 28. The sleeve 27 is rotatably mounted on the fixed shaft 19 and is vertically fixed thereon by fixed collars 29. A tension spring 30 is secured, at its respective ends, to the collar 26 and to a similar collar 31 that is likewise slidably mounted on the sleeve 27 and engaged by the keys or splines 28 to preclude relative rotation between the sleeve and the collar.

An internally screw-threaded member 32 is disposed on a correspondingly screw-threaded portion of the fixed shaft 19 near the lower end of the shaft and comprises a worm gear portion 33 and a collar portion 34. The collar portion 34 is provided with an annular groove or depression 35, the side walls of which are adapted to engage the lower ends of a yoke 36. The upper ends of the yoke 36 are similarly adapted to be engaged by the side walls of an annular groove or depression 37 in the rotatable collar 31.

The worm gear portion 33 of the member 32 is operatively engaged by a worm 38 that is adapted to be driven by a bevel gear 39. The bevel gear 39 is engaged by a similar bevel gear 40 that is adapted to be driven, through a bevel gear 41, by a ring gear 42 of a differential mechanism 43. The ring gear 42 comprises two spider arms 44 which provide bearing supports for two planetary bevel gears 45. The planetary gears 45 are engaged by two driving bevel gears 46 and 47 that are mounted on the shafts of two similar synchronous electric motors 48 and 49, respectively. The ring gear 42 receives its bearing support from the shaft of the motor 48, upon which it is rotatably mounted. The motors 48 and 49 are, preferably, of the salient-pole synchronous-induction type, in order to render the same self-starting, and are adapted to rotate in opposite directions in order that the speed of rotation of the ring gear 42 may be proportional to the difference between the speeds of rotation of the two motors.

The governor 17 is provided with a base portion 50 which may include any suitable mechanism, such as an oil-pressure system, for controlling the degree of opening of the gate valve 15, to which it is operatively connected. Such mechanism is well known in the art and, therefore, is not shown and described in detail in this application. This governor mechanism is adapted to control the degree of opening of the gate valve 15 in accordance with the position of a vertical rod 51, the upper end of which is operatively engaged by one end of a lever arm 52. The lever arm 52 is mounted, at an intermediate point thereof, upon a pivot 53. The other end of the lever arm 52 is adapted to be engaged by the side walls of an annular groove or depression 54 that is provided in the rotatable collar 26.

The vertical rod 51 so controls the governor mechanism in response to variations in the position of the collar 26 that the degree of opening of the gate valve 15 is greater when the collar 26 assumes a relatively low position on the vertical sleeve 27 than when the collar 26 assumes a relatively high position on the sleeve. According to this method of operation, the degree of opening of the gate valve 15 is inversely controlled in accordance with the distance which the collar 26 is actuated upwardly on the sleeve 27.

The operating mechanism of the governor 17 also comprises an electromagnet or solenoid coil 55, which must be energized at all times to permit opening of the gate valve 15. When the solenoid 55 is energized, the degree of opening of the gate valve 15 is automatically controlled by the operation of the fly-ball governor 17, but, when the solenoid is deenergized, the gate valve 15 is acuated to its closed position. One terminal of the solenoid 55 is connected, through a switch 56, to a control bus 57, and the other terminal is connected directly to a control bus 58. The control busses 57 and 58 are continuously energized from a source of control energy, such as a battery 59.

A relay device 60 for controlling the circuits of the differential motors 48 and 49 comprises an operating coil 61 and four switches 62, 63, 64 and 65, all of which are adapted to be closed when the operating coil 61 is energized. One terminal of the operating coil 61 is connected, through the switch 56, to the control bus 57, and the other terminal of this coil is connected, through an auxiliary switch 66 of the circuit interrupter 12, to the control bus 58. The auxiliary switch 66 is closed when the circuit interrupter 12 is in its open position and is open when the circuit interrupter 12 is closed.

The circuit interrupter 12 is provided with an operating coil 67 which, when energized, effects and maintains closure of the circuit interrupter. When the coil 67 is deenergized, the circuit interrupter 12 is opened by the action of gravity or any suitable means provided for this purpose. One terminal of the operating coil 67 is connected, through a switch 68 of a synchronizer 69 and the switch 56, to the control bus 57. The lower terminal of the operating coil 67 is connected directly to the control bus 58. The synchronizer 69 comprises suitable windings (not shown) that are connected to the secondary windings of two auxiliary transformers 70 and 71.

The primary windings of the transformers 70 and 71 are connected to the terminals of the armature windings 2 of the dynamo-electric machine 1 and to the alternating-current circuit 13, respectively. The synchronizer 69 is adapted to close its switch 68 when the two alternating-current circuits to which its windings are respectively connected are in a synchronous condition. Such devices are well known in the art, and, consequently, the structure of the synchronizer 69 is not shown and described in detail in this application.

One terminal of the synchronous motor 48 is connected directly to one terminal of the secondary windings of the auxiliary transformer 70, and one terminal of the synchronous motor 49 is correspondingly connected to one terminal of the secondary windings of the auxiliary transformer 71. The other two terminals of the synchronous motor 48 are adapted to be connected, either through the switches 62 and 63 of the relay 60 or through two switches 72 and 73 of a relay 74, to the other two terminals of the secondary windings of the auxiliary transformer 70. The other two terminals of the synchronous motor 49 are similarly adapted to be connected, either through the switches 64 and 65 of the relay 60 or through two switches 75 and 76 of a relay 77, to the other two terminals of the secondary windings of the auxiliary transformer 71.

The relay 74 is provided with an operating coil 78, one terminal of which is connected through a resistor 79, to the control bus 57. The other terminal of the operating coil 78 is connected, through a switch 80 of a relay 81, to the control bus 58. The relay 81 comprises an operating coil 82, one terminal of which is connected, through a switch 83, to the control bus 57 and the other terminal of which is directly connected to the control bus 58. The relay 81 is provided with a second switch 84 that is connected in parallel relation to an operating coil 85 of a relay 86.

One terminal of the operating coil 85 of the relay 86 is connected, through a resistor 87, to the control bus 57 and the other terminal thereof is directly connected to the control bus 58. The relay 86 comprises a switch 88 that is adapted to be opened immediately upon the energization of the operating coil 85 and to be closed a relatively short interval of time after the coil 85 is deenergized. The delay in closing the switch 88 is effected by a short-circuited conductor 89 that is so disposed with respect to the core member of the relay 86 as to prevent the immediate collapse of magnetic flux therein when the operating coil of the relay is deenergized.

The relay 77 is provided with an operating coil 90, one terminal of which is connected, through a resistor 91, to the control bus 57 and the other terminal of which is connected, through a switch 92 of a relay 93, to the control bus 58. The relay 93 comprises an operating coil 94, one terminal of which is connected, through a switch 95, to the control bus 57 and the other terminal of which is connected directly to the control bus 58. The relay 93 also comprises a switch 96 that is connected in parallel relation to the terminals of an operating coil 97 of a relay 98.

One terminal of the operating coil 97 of the relay 98 is connected, through a resistor 99, to the control bus 57 and the other terminal of this coil is connected directly to the control bus 58. The relay 98 comprises a switch 100 that is adapted to be opened immediately upon the energization of the operating coil 97 and to be closed a relatively short interval of time after the deenergization of this operating coil. This delay in the closure of the switch 100 is effected by a short-circuited conductor 101 that is associated with the core member of the relay 98 in the same manner that the conductor 89 is associated with the core member of the relay 86.

Having described an automatic station embodying my invention, the operation of the station for the purposes set forth will now be described.

Assuming that the station is at rest and disconnected from the circuit to which it is adapted to supply energy, the operation of the station is initiated by closure of the switch 56. This switch may be actuated manually at the station, or it may be provided with any desired remote or supervisory control apparatus for effecting the operation thereof from some other point. The switch 56 must be maintained in its closed position as long as operation of the station is to be continued.

Upon the closure of the switch 56, the solenoid coil 55 of the governor 17 is energized from the control source 59 through the control busses 57 and 58. The governor 17 is thereupon rendered operative to control the degree of opening of the gate valve 15 in accordance with the position of the collar 26, which is determined by the position of the fly-balls 24. Since the prime mover 4 has not yet started to operate, the rotatable parts of the governor 17 are at rest, and the fly-balls 24, and, hence the collar 26 are in their lowermost positions. Accordingly the lever arm 52 is in such position that the vertical rod 51 is raised to its uppermost position, which results in the immediate actuation of the gate valve 15 toward its maximum degree of opening. The prime mover 4 and the dynamo-electric machine 1 thus start to rotate at an increasing rate of speed, and the rotatable parts of the governor 17 are driven at a proportionate speed to cause the fly-balls 24 and the collar 26 to assume positions dependent upon this speed.

At the time the solenoid coil 55 of the governor 17 was energized in response to closure of the switch 56, the operating coil 61 of the relay 60 was also energized from the same circuit to cause this relay to close its switches 62, 63, 64 and 65. The closure of these switches effects connection of the synchronous motors 48 and 49 to the secondary windings of the auxiliary transformers 70 and 71, respectively. Accordingly, the motors 48 and 49 commence to rotate at speeds that are directly proportional to the frequencies of the electromotive forces of the dynamo electric-machine 1 and the alternating-current circuit 13, respectively.

Since the frequency of the elctromotive forces of the dynamo-electric machine 1 is less than that of the circuit 13, the motor 49 is rotated at a greater speed than is the motor 48, and the ring gear 42 of the differential mechanism 43 is rotated at a speed that is proportional to the difference in these frequencies. The screw-threaded member 32 is, therefore, turned in response to the rotation of the ring gear 42 through the bevel gears 41, 40 and 39, worm 38 and the worm gear portion 33 of the member 32, to cause the member 32 to be actuated downwardly on the screw-threaded portion of the shaft 19. The rotatable collar 31 is likewise actuated downwardly by reason of the fact that it is mechanically connected to the collar portion 34 of the screw-threaded member 32 by the yoke 36.

The downward actuation of the collar 31 increases the tension of the spring 30, with the result that the upward movement of the collar 26, in response to the increasing speed of the prime mover 4 and the dynamo-electric machine 1, is retarded. Thus, the governor 17 permits the gate valve 15 to admit energy to the prime mover 4 at a relatively rapid rate when the speed of the prime mover 4 is below normal. As the speed increases, however, the frequency of the electromotive force of the dynamo-electric machine 1 increases proportionately to effect a proportionate increase in the speed of the synchronous motor 48. As the speed of the motor 48 approaches that of the motor 49, the speed of rotation of the ring gear 42 of the differential mechanism 43 is decreased and reaches zero when the speeds of the motors 48 and 49 are equal.

When this condition occurs, if the gate valve 15 has been actuated to a greater degree of opening than is necessary to cause the prime mover 4 to operate at its normal speed, the speed of the motor 48 will exceed that of the motor 49 to cause the tension of the spring 30 to be decreased. The fly-balls 24 will, therefore, be permitted to move outwardly, thereby raising the collar 26 and correspondingly actuating the vertical rod 51 downwardly. This causes the degree of opening of the gate valve 15 to be decreased to permit a decrease in the speed of the prime mover 4.

Thus, it will be seen that the tension of the spring 30 is varied in proportion to the difference in frequencies of the electromotive forces of the dynamo-electric machine 1 and the circuit 13. If the difference between these frequencies is relatively slight, the change in tension of the spring 30 is correspondingly slow, while, if the difference in the frequencies is relatively great, the change is made more rapidly. This method of operation effects a rapid equalizing of the two frequencies.

When the frequencies are thus equalized, and the phase-angle positions of the electromotive forces of the dynamo-electric machine 1 and the circuit 13 correspond, the synchronizer 69 effects closure of its switch 68. The operating coil 67 of the circuit interrupter 12 is thus energized to effect closure of this circuit interrupter to connect the armature windings 2 of the dynamo-electric machine 1 to the circuit 13.

When the circuit interrupter 12 is closed, its auxiliary switch 66 is opened to interrupt the energizing circuit for the operating coil 61 of the relay 60. This relay thereupon opens its switches 62, 63, 64 and 65 to disconnect two terminals of each of the motors 48 and 49 from the corresponding terminals of the secondary windings of the auxiliary transformers 70 and 71, respectively. Since the degree of opening of the gate valve 15 is just sufficient to cause the prime mover 4 to drive the dynamo-electric machine 1 at its normal speed without load, it is necessary to adjust the governor 17 to cause the dynamo-electric machine 1 to supply energy to the alternating-current circuit 13 after the circuit interrupter 12 is closed.

The load adjustment of the governor 17 is controlled by the switches 83 and 95, which may be either manually controlled at the station, or controlled from some other point through any suitable supervisory or remote-control system, or automatically controlled by any suitable load-measuring or regulating device. The switch 83, when closed, effects a decrease in the load assumed by the dynamo-electric machine 1, and the switch 95, when closed, effects an increase in the load. These switches, obviously, may be controlled by the load-measuring or regulating device.

Assuming that the dynamo-electric machine 1 is connected to the circuit 13 through the circuit interrupter 12 and has not yet assumed any load, the switch 95 must be closed to effect energization of the operating coil 94 of the relay 93. That relay thereupon closes its switches 92 and 96.

The closure of the switch 92 completes the energizing circuit of the operating coil 90 of the relay 77 through the resistor 91. The relay 77 thereupon closes its switches 75 and 76 to complete the connection of the synchronous motor 49 to the secondary windings of the auxiliary transformer 71. The motor 49 immediately starts to rotate to effect actuation of the collars 34 and 31 of the governor 17 downwardly. This action increases the tension of the spring 30, with the result that the collar 26 is momentarily actuated downwardly to effect an increase in the degree of opening of the gate valve 15.

Since the motor 48 is deenergized, its rotor is free to rotate and will start to rotate by reason of the action of the differential mechanism 43 as soon as the motor 49 is energized. The inertia of the rotor of the motor 48 causes the differential mechanism 43 to transmit motion to the adjusting mechanism of the governor for a short interval of time. As soon as this inertia is overcome, the motor 48 will attain a speed substantially equal to that of the motor 49, and the actuation of the adjusting member 32 will continue at a slow rate as long as motor 49 remains energized.

If desired, the motors 48 and 49 may be provided with suitable brakes to maintain their rotors stationary when the corresponding motor is deenergized. In case such brakes are provided, or in case the inertia of the rotors of these motors is so great that too long an interval of time is required for this inertia to be overcome, it is necessary to provide means for interrupting the energizing circuit of the motors after a predetermined change in the adjustment of the governor 17 has been effected.

It is for the purpose of limiting the interval of time during which the motors 48 and 49 may be energized to effect a load adjustment of the governor 17 that the relays 86 and 98 are provided. The relay 98 effects deenergization of the motor 49, after a predetermined interval of time, by reason of the fact that the operating coil 97 of the relay 98 is short-circuited by the switch 96 of the relay 93 when that relay is actuated to effect energization of the motor 49. When the operating coil 97 of the relay 98 is thus short-circuited, the movement of its switch 100 toward its closed position commences. The switch 100 is delayed, however, by reason of the retarding effect of the short-circuited conductor 101, which retards the collapse of magnetic flux in the core member of the relay after the operating coil 97 is deenergized.

As soon as this magnetic flux has collapsed, the switch 100 is closed to short-circuit the operating coil 90 of the relay 77, which thereupon opens its switches 75 and 76 to deenergize the motor 49. Thus, it will be seen that the motor 49 is permitted to be energized only for a relatively short interval of time in response to closure of the switch 95, with the result that a relatively slight change is made in the adjustment of the governor 17. If a single closure of the switch 95 does not effect the desired change in the load adjustment of the governor 17, the switch 95 must be opened and re-closed to permit the relay 98 to open its switch 100 and to permit all of the controlling devices to repeat the above-described cycle of operations. These operations may be repeated as many times as is necessary to obtain the desired adjustment of the governor 17.

If, at any time during the operation of the station, it is desired that the load on the dynamo-electric machine 1 be decreased, the switch 83 is closed. The relay 81 thereupon closes its switches 80 and 84 to effect, simultaneously, the energization of the operating coil 78 of the relay 74 and short-circuiting of the operating coil 85 of the relay 86. The relay 74 closes its switches 72 and 73 to complete the energizing circuit of the motor 48, and, after this energizing circuit has been completed for a predetermined interval of time, the relay 86 closes its switch 88 to effect interruption thereof in the same manner that the relay 98 effects interruption of the energizing circuit of the motor 49.

Thus, it will be seen that the governor 17 may be adjusted at any time during the operation of the station either to increase or to decrease the load on the dynamo-electric machine 1. This result is obtained by the same motors and differential mechanism that are utilized to adjust the speed of the dynamo-electric machine 1 to its proper value before the circuit interrupter 12 is closed to connect the armature windings 2 to the alternating-current circuit 13.

The operation of the station may be stopped at any time by opening the switch 56 to interrupt the energizing circuits of the governor solenoid coil 55 and the operating coil 67 of the circuit interrupter 12. The circuit interrupter 12 is thereupon opened to disconnect the armature windings 2 of the dynamo-electric machine 1 from the circuit 13, and the governor 17 effects closure of the gate valve 15 to stop the operation of the prime mover 4 and dynamo-electric machine 1. All of the apparatus in the station is then at rest and ready to respond to the operation of the controlling equipment in the same manner as previously described.

In some installations of the automatic generating station above described, it may be desirable that, after the generator has been synchronized with the line, the incoming generator shall immediately assume its maximum load. An arrangement by which this result may be accomplished is shown in Fig. 2 in which the generator is represented at 1 and the alternating-current system at 13. The circuit interrupter 12 operates to connect the generator to the line when synchronism has been attained. The operation of the circuit interrupter 12 is controlled by the synchronizer 69 which is energized by the respective transformers 70 and 71 connected to the generator 1 and the line 13. The switch 56 also controls the circuit of the closing coil 67 of the circuit interrupter 12.

At 50 is shown a portion of the governor and the differential mechanism for controlling the tension of the governor spring. The complete governing mechanism is, of course, identical with that shown in Fig. 1, but only so much thereof is shown as is necessary to an explanation of the system of Fig. 2. The solenoid 55 is utilized to perform the same function as described in connection with Fig. 1. The motors 48 and 49 are energized, respectively, from the generator 1 and the line 13. The circuit of the motor 48 is controlled by a relay 118 having switches 124 and 125 and a relay 113 having switches 114 and 115. Similarly, the circuit of the motor 49 is controlled by switches 116 and 117 of relay 113, and by switches 127 and 128 of relay 123. The relay 118 also operates a switch 120' which completes a circuit from the battery 59 through conductor 119, a limit switch 120, the operating coil of relay 123, the switch 56 and thence to the battery 59. The relay 123 is also provided with a switch 126, which, when closed, shunts the switch 120', leaving the relay 123 under the sole control of the limit switch 120.

The switch 120 is composed of a fixed contact strip 121 and a moving contact 122 which is secured to, but insulated from, the yoke 36 which connects the members 34 and 31, as shown fully in Fig. 1. Obviously, the moving contact of the limit switch may be associated with any element of the differential mechanism, provided that the switch is closed at all times except when the governor spring is at its maximum setting.

The general scheme of operation of the system shown in Fig. 2 is as follows:

After the generator 1 has been synchronized with the circuit 13, the generator is caused to assume its load by stopping the motor 48 while the motor 49 remains energized until the generator takes on its rated load, when the motor 49 is stopped, by the opening of limit switch 120, in contradistinction to the method described in connection with Fig. 1, in which both motors are stationary and one or the other is started to cause the generator to assume an increased load or a decreased load. It is found that operation under the method about to be described is more successful than that of Fig. 1.

To initiate operation of the generating station of Fig. 2, the switch 56 is closed either manually, automatically, or through a supervisory system, just as in Fig. 1. The closure of the switch 56 completes a circuit from the battery 59 through the coil of relay 113 which, when energized, closes the switches 114, 115, 116 and 117. The closure of the switch 56 also energizes the governor solenoid 55 placing the gate valve under the control of the governor. The operating coil of relay 118 is also energized by closure of the switch 56, the circuit being from the battery 59 to the operating coil of the relay 118 through the interlock 66 on the circuit interrupter 12, through conductor 119' and switch 56, back to battery 59.

Generally, when the station is about to be started, the limit switch 120 will be open. The reason for this condition will appear hereafter. The energization of the operating coil 118 results in the closure of its switches 120', 124 and 125.

Energization of the solenoid 55 causes water to be admitted to turbine 4 and, as a result, the generator 1 is started and brought up to speed. As the generator speed increases, the motor 48 is energized by the voltage of the generator through the switches 124, 125 and 114 and 115. The third lead to the motor 48 is permanently connected to its transformer 70. Operation of the motor 48, while the motor 49 is stationary, as explained in connection with Fig. 1, causes the governor spring to be released by the upward movement of yoke 36. This upward movement of the yoke causes the conductor 122 of the limit switch 120 to be brought in contact with the contact strip 121. The closure of the limit switch 120 completes a circuit for the operating coil of the relay 123, the circuit being from the battery 59 through the switch 56, operating coil of relay 123, contact 121 and contact 122 of limit switch 120, switch 120' of relay 118, back to the battery 59. The operation of the relay 123 completes a circuit for the motor 49 to the line 13 through its switches 127 and 128 and the switches 116 and 117 which were closed by the energization of the operating coil of relay 113. In addition to completing the circuit for the motor 49, the operation of the relay 123 closes the switch 126 which, as above stated, shunts the switch 120' leaving the circuit of the operating coil of relay 123 under the sole control of the limit switch 120.

With the motors 48 and 49 connected to the generator and line, respectively, the generator speed will be so varied as to synchronize the generator with the line, as explained in connection with Fig. 1. When the generator has been properly synchronized, the synchronizer 69 will close its contact 68 to complete the circuit for the operating coil 67 of the circuit interrupter 12. Energization of the coil 67 results in the operation of the circuit interrupter 12 to connect the generator 1 to the circuit 13, and also to open switch 66.

When the switch 66 opens, the operating coil of relay 118 is deenergized and switches 120', 124 and 125 are opened. The opening of switch 120' has no effect on the remainder of the circuit, since, as stated above, it is shunted by the switch 126 of the relay 123. The opening of switches 124 and 125, however, disconnects the motor 48 from the generator 1. The motor 48, therefore, is deenergized, and continues to rotate because of its own inertia and its mechanical connection to the motor 49 which, remaining energized, continues to rotate. Bearing friction, however, causes the speed of motor 48 to be slightly less than that of motor 49, and this difference in the speeds of the two motors, through the differential mechanism, causes the operation of the screw threaded member 32 on the shaft 19 in such a direction as to increase the tension of the governor spring at a slow rate. The downward movement imparted to the yoke 36 by the screw threaded member 32 causes the separation of the contacts 122 and 121 of the limit switch 120 when the governor spring has reached a setting corresponding to the maximum generator load. The opening of the limit switch 120 deenergizes the operating coil of the relay 123, and the subsequent opening of switches 127 and 128 disconnects the motor 49 from the line 13. Both of the motors 48 and 49 are now disconnected and stationary, and the governor spring is at the setting corresponding to maximum generator load.

Briefly, therefore, the operation of the system shown in Fig. 2 is to start the turbine 4 and the generator 1 to synchronize the generator with the line, and, when the generator has been paralleled with the line, to adjust the governor spring so that the opening of the gate valve is adjusted to the setting at which the generator assumes its rated load.

It will be understood from the foregoing description that I have provided two means for adjusting the tension of the governor spring 30 by means of motors 48 and 49 and the differential mechanism 43. According to the first method, only one of the motors 48 and 49 is energized, and the difference in the speeds of the motor which is energized and that which, though deenergized, is driven through the differential mechanism, causes the desired adjustment of the governor spring. The second method of adjustment requires that both the motors 48 and 49 be initially energized. When one of them is subsequently deenergized, the slight difference between its speed, as it continues to rotate, being driven through the differential mechanism, and that of the motor which remains energized, causes the proper movement of the traveling nut 33 which movement varies the tension of the governor spring 30.

The stopping of the system shown in Fig. 2 is accomplished in the same way as that shown in Fig. 1. The switch 56, which is closed as long as the station is in operation, is opened to deenergize the solenoid 55 which permits the governor mechanism to close the gate valve independently of the differential mechanism and the rotating system connected thereto. The opening of the switch 56 also deenergizes the coil of the relay 113 and the coil 67 of the circuit interrupter 12. The result of the operation of the switch 56, therefore, is that the supply of water to the turbine is cut off and the generator 1 is disconnected from the circuit 13. Since the governor spring was at its maximum setting when the switch 56 was opened, the limit switch 120 will remain open during the period in which the station is idle. It will be closed, however, as described above, when the operation of the station is again initiated by the closure of the switch 56.

Instead of employing the system of Fig. 1 for manually causing the generator to assume any desired load, it may be desirable to utilize a system such as that shown in Fig. 3, in which the generator, circuit interrupter, line and transformers are the same as indicated in Figs. 1 and 2. The operation of the station is controlled by means of a switch 105 having stationary contacts 106 and 107, 108 and 109 and a moving contact 104, which is broad enough to engage either contacts 106 and 108, or contacts 107 and 109, simultaneously. The relay 113, as in Fig. 2, connects the motors 48 and 49 to the generator and the line circuits, respectively. The circuit of the motor 48 is also under the control of switches 135 and 136 which are opened when the operating coil of the relay 137 is energized. Likewise, the circuit of motor 49 is under the control of switches 138 and 139 which are opened when the operating coil of relay 140 is energized. The differential and governor mechanism in Fig. 3 is only partially shown, but is identical with that shown in Fig. 1.

It is to be understood that, instead of a manual switch for controlling the adjustment of the load carried by the generator 1, I may control the various relays from a distance, by any system of supervisory control.

In the operation of the system shown in Fig. 3, when it is desired to start the station, the switch 56 is closed and a circuit is thereby completed from the battery 59 through the switch to the governor solenoid 55 and back to the battery. At the same time, a circuit is completed from battery 59 through the switch 56 to the operating coil of relay 113, contact 66, which is closed when the breaker 12 is open, and back to the battery. Energization of the solenoid 55 and the operation of relay 113, in a manner similar to that explained in connection with Figs. 1 and 2, cause the turbine to be started and the generator to be brought up to speed. The motors 48 and 49, during the starting period, rotate at speeds proportional to the frequencies of the generator 1 and line 13. These motors, through the differential mechanism, operate to synchronize the generator with the line, and, when synchronism is indicated by the synchronizer 69, contact 68 is closed and the operating coil 67 of the circuit interrupter 12 is energized by the completion of a circuit from battery 59, through switch 56, contact 68, the operating coil of relay 67 and back to battery 59. When the generator is synchronized with the line, and the paralleling breaker 12 is closed, contact 66 is opened, interrupting the circuit through the coil of relay 113. Contacts 114, 115, 116 and 117 are thereupon opened, and the motors 48 and 49 are deenergized.

Now, if it is desired that the generator assume a portion of the system load, the switch 105 is moved to such a position that contact 104 will engage contact 106. A circuit is thus completed from battery 59, through switch 56, operating coil of relay 113, contact 106, contact 104, and thence back to the battery. The relay 113 is thereupon energized, and contacts 114, 115, 116 and 117 are closed to energize simultaneously the motors 48 and 49. To cause the generator to take on an increased load, the switch 105 is moved so that its contact 104 engages contact 108 as well as 106. This operation results in the energization of the coil of relay 137 which opens the contacts 135 and 136 to deenergize the motor 48. Continued rotation of the motor 49, which remains connected to the line, operates in the manner previously described to increase the tension of the governor spring. When the generator, in response to an adjustment of the governor spring, assumes the desired load, switch 105 is disengaged from the contact 108. The relay 137 is then deenergized and the motor 48 again rotates at normal speed. When the desired load adjustment has been secured, if the switch 105 is moved to its central position, both motors 48 and 49 will be deenergized and the generator will continue to supply the load for which the governor spring was adjusted.

When it is desired to decrease the load carried by the generator, it is only necessary to move the contact 104 into engagement with the contact 107. This, of course, results in the simultaneous energization of motors 48 and 49. Further movement of the switch 105 into engagement with the contact 109 completes a circuit to the operating coil of relay 140 which, when energized, opens the switches 138 and 139 to disconnect the motor 49 from the line. The deenergization of the motor 49, while the motor 48 continues to rotate, causes the governor-controlling spring to be released so that the load on the generator is reduced as the result of partial closing of the gate valve 15. When the generator load has been reduced sufficiently, switch 105 is moved so that it no longer engages contact 109. This leaves both motors 48 and 49 energized and rotating at the same speed so that no further change is effected in the governor spring setting. Further movement of the switch 105 to its neutral position disconnects both motors.

When it is desired to stop the generator, it is only necessary to open the switch 56, as in Figs. 1 and 2, so that the circuit to the solenoid 55 is interrupted as well as the circuit to the operating coil of the circuit interrupter 12. The generator 1 is thereupon disconnected from the line 13, the gate valve 15 is closed and the station is again in condition for repetition of the above described starting cycle.

By means of the systems illustrated, the governor-control mechanism is controlled directly instead of through intermediate control devices, as has been customary heretofore.

After the speed of the prime mover and generator has been adjusted to permit synchronizing and subsequent connection of the generator to the bus, the control of the generator governor is transferred from the generator governor and line to other means to permit the control of the governor according to the load.

I claim as my invention:

1. In combination, an alternating-current circuit, a synchronous dynamo-electric machine adapted to be connected thereto, a prime mover for the dynamo-electric machine, a source of energy for the prime mover, governing means for controlling the rate of admission of energy from the source to the prime mover, adjustable means for varying the effectiveness of the governing means, and means for adjusting the adjustable means comprising two synchronous electric motors respectively connected to the alternating-current circuit and the dynamo-electric machine and a differential mechanism operatively disposed between the two motors and mechanically connected to the adjustable means.

2. In combination, an alternating-current circuit, a synchronous dynamo-electric machine adapted to be connected thereto, a prime mover for the dynamo-electric machine, a source of energy for the prime mover, governing means for controlling the rate of admission of energy from the source to the prime mover, adjustable means for varying the effectiveness of the governing means, and means for adjusting the adjustable means at a rate substantially in direct proportion to the difference in frequencies of the alternating-current circuit and the dynamo-electric machine, comprising two synchronous electric motors respectively connected to the alternating-current circuit and the dynamo-electric machine and a differential mechanism operatively disposed between the two motors and mechanically connected to the adjustable means.

3. In combination, an alternating-current circuit, a synchronous dynamo-electric machine adapted to be connected thereto, a prime mover for the dynamo-electric machine, a source of energy for the prime mover, governing means for controlling the rate of admission of energy from the source to the prime mover, adjustable means for varying the effectiveness of the governing means, and means for adjusting the adjustable means to cause the prime mover to drive the dynamo-electric machine at such a speed that the frequency of its electro-motive force will be equal to that of the electro-motive force of the alternating-current circuit, said adjusting means comprising two synchronous electric motors respectively connected to the alternating-current circuit and the dynamo-electric machine and a differential mechanism operatively disposed between the two motors and mechanically connected to the adjustable means.

4. In combination, an alternating-current circuit, a synchronous dynamo-electric machine adapted to be connected thereto, a prime mover for the dynamo-electric machine, a source of energy for the prime mover, governing means for controlling the rate of admission of energy from the source to the prime mover, adjustable means for varying the effectiveness of the governing means, means for adjusting the adjustable means comprising two synchronous electric motors respectively connected to the alternating-current circuit and the dynamo-electric machine and a differential mechanism operatively disposed between the two motors and mechanically connected to the adjustable means, means responsive to a synchronous condition of the dynamo-electric machine with respect to the alternating-current circuit for effecting connection of the dynamo-electric machine to the alternating-current circuit, and means rendered operable when such connection is effected for controlling the adjusting means to cause the dynamo-electric machine to assume any desired load.

5. In combination, an alternating-current circuit, a synchronous dynamo-electric machine adapted to be connected thereto, a prime mover for the dynamo-electric machine, a source of energy for the prime mover, governing means for controlling the rate of admission of energy from the source to the prime mover, adjustable means for varying the effectiveness of the governing means, means for adjusting the adjustable means at a rate substantially in direct proportion to the difference in frequencies of the alternating-current circuit and the dynamoelectric machine, comprising two synchronous electric motors respectively connected to the alternating-current circuit and the dynamo electric machine and a differential mechanism operatively disposed between the two motors and mechanically connected to the adjustable means, means responsive to a synchronous condition of the dynamo-electric machine with respect to the alternating-current circuit for effecting connection of the dynamo-electric machine to the alternating-current circuit, and means rendered operable when such connection is effected for controlling the adjusting means to cause the dynamo-electric machine to assume any desired load.

6. In combination, an alternating-current circuit, a synchronous dynamo-electric machine adapted to be connected thereto, a prime mover for the dynamo-electric machine, a source of energy for the prime mover, governing means for controlling the rate of admission of energy from the source to the prime mover, adjustable means for varying the effectiveness of the governing means, means for adjusting the adjustable means to cause the prime mover to drive the dynamoelectric machine at such a speed that the frequency of its electromotive force will be equal to that of the electro-motive force of the alternating-current circuit, said adjusting means comprising two synchronous electric motors respectively connected to the alternating-current circuit and the dynamo-electric machine and a differential mechanism operatively disposed between the two motors and mechanically connected to the adjustable means, means responsive to a synochronous condition of the dynamo-electric machine with respect to the alternating-current circuit for effecting connection of the dynamo-electric machine to the alternating-current circuit, and means rendered operable when such connection is effected for controlling the adjusting means to cause the dynamo-electric machine to assume any desired load.

7. An automatic generating station comprising a generator adapted to supply electrical enegry to a circuit, means for connecting the generator to the circuit when properly synchronized therewith, a prime mover for driving the generator, a source of energy for the prime mover and means for controlling the admission of energy to the prime mover in accordance with the difference in the frequencies of the generator and circuit comprising a governor controlled by a differential mechanism driven by two synchronous motors connected to the generator and circuit, respectively, to synchronize the generator and the circuit, and means for controlling said synchronous motors after the generator has been connected to the circuit whereby the generator may be caused to supply any desired portion of the load on the circuit.

8. In an automatic generating station, a turbine, a source of energy for operating the turbine, a governor for controlling the supply of energy to the turbine, a generator adapted to be driven by the turbine and a distribution circuit adapted to be connected to the generator, an adjusting spring for the governor and means including synchronous motors, adapted to be connected to said generator and said circuit, respectively, a differential mechanism driven jointly by said motors, a gear train, actuated by said differential mechanism, and an adjusting nut driven thereby for varying the tension of said spring.

In testimony whereof, I have hereunto subscribed my name this 5th day of December, 1927.

CYRIL C. LEVY.